(12) United States Patent
Sappey et al.

(10) Patent No.: US 8,745,084 B2
(45) Date of Patent: Jun. 3, 2014

(54) REPOSITORY CONTENT ANALYSIS AND MANAGEMENT

(75) Inventors: Dean Sappey, Sydney (AU); Shane Barnett, Sydney (AU)

(73) Assignee: DocsCorp Australia, Sydney (AU)

( * ) Notice: Subject to any disclaimer, the term of this patent is extended or adjusted under 35 U.S.C. 154(b) by 274 days.

(21) Appl. No.: 13/279,944

(22) Filed: Oct. 24, 2011

(65) Prior Publication Data

US 2013/0024475 A1 Jan. 24, 2013

Related U.S. Application Data

(60) Provisional application No. 61/509,720, filed on Jul. 20, 2011, provisional application No. 61/531,410, filed on Sep. 6, 2011.

(51) Int. Cl.
*G06F 17/30* (2006.01)

(52) U.S. Cl.
USPC .................................. 707/771; 707/E17.005

(58) Field of Classification Search
None
See application file for complete search history.

(56) References Cited

U.S. PATENT DOCUMENTS 8,296,297 B2 * 10/2012 Green et al. .................. 707/736
8,301,498 B1 * 10/2012 Cortes et al. ............... 705/14.49

* cited by examiner

*Primary Examiner* — Anteneh Girma
(74) *Attorney, Agent, or Firm* — Sughrue Mion, PLLC

(57) ABSTRACT

A repository content analysis and management system includes a periodic searching device connected to a repository, a content analysis heuristic engine for non-trivial assessment of content returned by the searching device, a processing engine to transform content detected through assessment, and a file management device to manage the operations on content to and from the repository.

20 Claims, 7 Drawing Sheets

REPOSITORY CONTENT ANALYSIS AND MANAGEMENT

CROSS REFERENCE TO RELATED APPLICATIONS

This application claims the benefit of priority from (1) U.S. Provisional Application 61/531,410 filed Sep. 6, 2011, and also from (2) U.S. Provisional Application 61/509,720 filed Jul. 20, 2011, the disclosures of which are incorporated herein, by reference, in their entirety.

BACKGROUND

1. Field of the Invention

The inventive concept relates generally to the transformation of content stored in a repository. More particularly, it relates to searching repositories for specific content, performing an analysis to determine what content should be transformed, and managing this process.

2. Background

Organizations have invested heavily in File Systems, Document Management Systems (DMS), Content Management Systems (CMS) or Enterprise Content Management (ECM). These may be understood, in a non-limiting manner, to be examples of what is meant by the term, "repository." The rationale behind that investment includes but is not limited to storing content, allowing controlled access to that content, and allowing for quick and easy retrieval of that content.

Content stored in these repositories can be any datatype. Examples of documents with different datatypes include Word format documents, PDF documents and image documents. This short list of datatypes is not meant to be exhaustive, however, and repositories can store files of any datatype. For files that are of datatypes in which the content includes data in human understandable form (e.g., words, numbers, images etc.), text based search is commonly used to find particular content for subsequent retrieval. For this to be successful, the text in the content has to be discoverable by some means. That is to say, the content has to be text searchable.

FIG. 7 illustrates this situation. Repository content of a wide variety of types enters a repository, but many of these types are not text searchable.

Many business processes result in non-text searchable documents being stored in a repository. This can occur with scanned images saved as TIFF or image-based PDF, emails having TIFF or image-based PDF attachments, electronic faxes saved as TIFF or PDF, legacy documents retained over many years and documents from business acquisition or other file ingestion.

One problem facing organizations is the risks associated with storing these non text searchable documents. Such risks include the possible failure to find a critical document required to comply with e-discovery orders/litigation, time and effort wasted recreating content due to failure to locate a document, misfiling a document and never finding it again, and also repository users losing confidence in the ability of their systems to find and retrieve content. These risks, if not mitigated, can include, but are not limited to, monetary, productivity and/or reputational impact.

Ad hoc approaches to avoiding the risks of non text searchable content being stored in a repository focus on performing Optical Character Recognition (OCR) on these documents during the creation workflow. A creation workflow may be understood as a process of getting documents into the repository. Examples include carrying out an OCR process as documents are scanned, or carrying out an OCR process when receiving documents that are previously created elsewhere. These ad hoc approaches attempt to ensure all documents are text searchable at the time they enter the repository.

These ad hoc approaches have a number of undesirable qualities.

One such disadvantage is that some documents will inevitably make it to the repository without having been first made text searchable. The focus in an ad hoc approach is on processing the documents before they enter the repository, but human and machine factors often intervene to frustrate this goal. OCR is often not performed on documents when it should have been. Examples of such factors include users being able to avoid OCR at the scan workflow step, and being motivated to avoid the step because they feel that it takes too long or is too complicated to effect the OCR process.

Another example involves emails with attachments. These are increasingly stored directly in repositories, with attachments escaping assessment for text searchability. Mobile devices such as iPads, iPhones and Blackberries collect, create and then store content into repositories, and such mobile devices are often outside the normal workflow processes that are capable of screening for text searchability.

Yet another example involves bulk import of data from third parties where text searchability is not guaranteed. Such scenarios can result in the importation of substantial numbers of files that lack text searchability.

Another disadvantage of ad hoc approaches arises when OCR processes are unnecessarily run on predominately text searchable documents, for example when there is a bulk import of existing PDF's into a repository. Ad hoc approaches sometimes make no assessment of the text searchable state of a PDF. The result is that documents are subjected to OCR processing even though they are already text searchable, thus leading to waste. This will result in excessive time lost to OCR processing and file management and could also affect the quality of the text searchability of the document. That is to say, it is not unusual that a subsequent OCR process on an already text-searchable document could result in the deterioration of the quality of the text searchability of a document.

Yet another disadvantage of the ad hoc approaches is the impact OCR processes can have when applied to image based documents, including changing the content in such a way as to reduce its value in intended future use. OCR processes frequently include operations meant to improve the quality of an image with respect to text searchability. Such operations may include de-skewing, de-speckling, image enhancement, and resolution adjustment on the source document. These manipulations often result in a new document being created and that document is a close facsimile of the original but is not the same in every way. Differences may include some substantial, visually perceptible changes to the image. Moreover, there is also the potential loss of annotations such as comments on PDF, attachments to PDF, form fields and values. In addition, metadata stored in the original file, as custom properties, can be lost. All of this may affect the future interpretation of a document or reduce its value as a valid record of the original.

One more disadvantage of ad hoc approaches is the impact of the additional processing time required for OCR processing when done at creation time or at document reception time. An OCR process is CPU and RAM intensive, and, depending on the length and nature of the input document, may take many minutes or even hours to complete. To OCR at the time of creation will be visibly slow to the person involved in the workflow, especially if the OCR process has to complete before the workflow can progress (i.e., if OCR must complete before the document can be saved into a document repository).

SUMMARY

The need exists for an improved system to produce text searchable content within a repository. Furthermore, there is a need for a system that does this while ensuring timely OCR of only appropriate documents, so that maintaining the fidelity of the original is preserved without a noticeable time impact on repository users.

To achieve the above and/or other objects, the below discussion is provided. It will be appreciated that the inventive concept presented below is discussed in the context of one or more exemplary embodiments. It will also be appreciated that the exemplary embodiments do not necessarily all overcome each mentioned disadvantage, and might not necessarily completely overcome any of the disadvantages.

The inventive concept is described in the context of one or more exemplary embodiments and will be elaborated with reference to the drawings. More particularly, an exemplary embodiment involves a periodic searching device connected to a repository that returns content for assessment. A content analysis heuristic engine assesses files returned from a content repository. The files assessed include, but are not limited to, image files, PDF, and MSG file content (specifically including image or PDF file content that is itself attachments to the MSG files). The heuristic rule applied detects files with no text context or insignificant text content and marks other files as of no interest in further processing. The detected files are made text searchable by adding a layer of hidden text to the files and, in the case of image files, by the conversion of the image file to PDF then the addition of the hidden layer of text. The text content comes from an Optical Character Recognition (OCR) process. A file management device replaces the original file in the repository with the transformed file, or creates new versions or files related in some way to the original file.

In accordance with an exemplary embodiment, the system provides a substantially complete and more reliable method of achieving text searchability by searching for, assessing, and then processing documents in the repository. According to an exemplary embodiment, the system allows for the discovery of legacy documents (backlog); detects and processes newly stored documents (active monitoring); runs targeted queries designed to return only small subsets of data (advanced query).

Through the use of a computer including a processor and memory coupled to the processor, and of a computer readable storage medium that carries out predetermined operations in accordance with a set of software instructions such as a computer software program, the content analysis tasks are automated by the system. Such tasks cannot reasonably be manually performed since the time required for the searching alone would approximate forever, and also since the creation of, e.g., hidden layers of text, as mentioned below in connection with an exemplary embodiment, cannot be carried out by humans unless aided by a computer. The processing steps and document outputs therefore may be implemented in a special or general purpose computer system.

DETAILED DESCRIPTION

Figure 1:
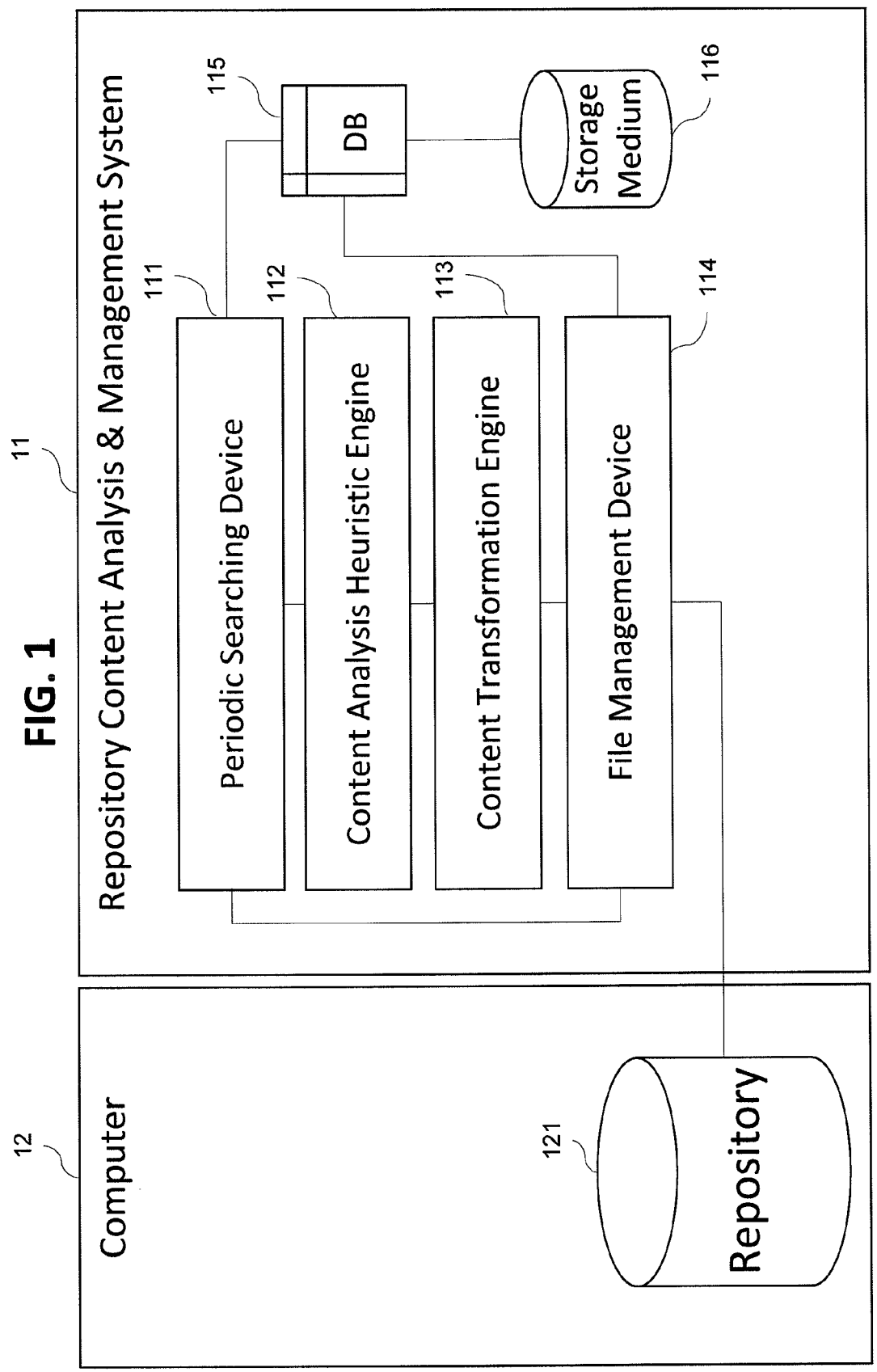
FIG. 1 is a block diagram showing an exemplary embodiment.

FIG. 1 shows a first exemplary embodiment. The system for repository content analysis and management in this exemplary embodiment includes a periodic search device 111, a Content Analysis Heuristic Engine 112, a processing engine 113 to transform content, a file management device 114, a database 115 and a storage medium 116. The repository content analysis and management system 11 operates on storage medium 121 in a repository 12.

In an exemplary embodiment this system improves on ad hoc approaches, to addressing non searchable content risks within a content repository, by acting on content once it is inside the repository rather than before that time or at the time the content is added to the repository. The drawbacks to the ad hoc approaches include: (1) users may actively avoid the transformation steps due to a perception that they take too long, (2) emails with attachments from external sources are not easily assessed for text searchability, (3) mobile devices such as iPad, iPhone and Blackberry collect, create and store content within a repository without checks, and (4) bulk imports of data may occur where text searchability is not assured or checked.

Figure 2:
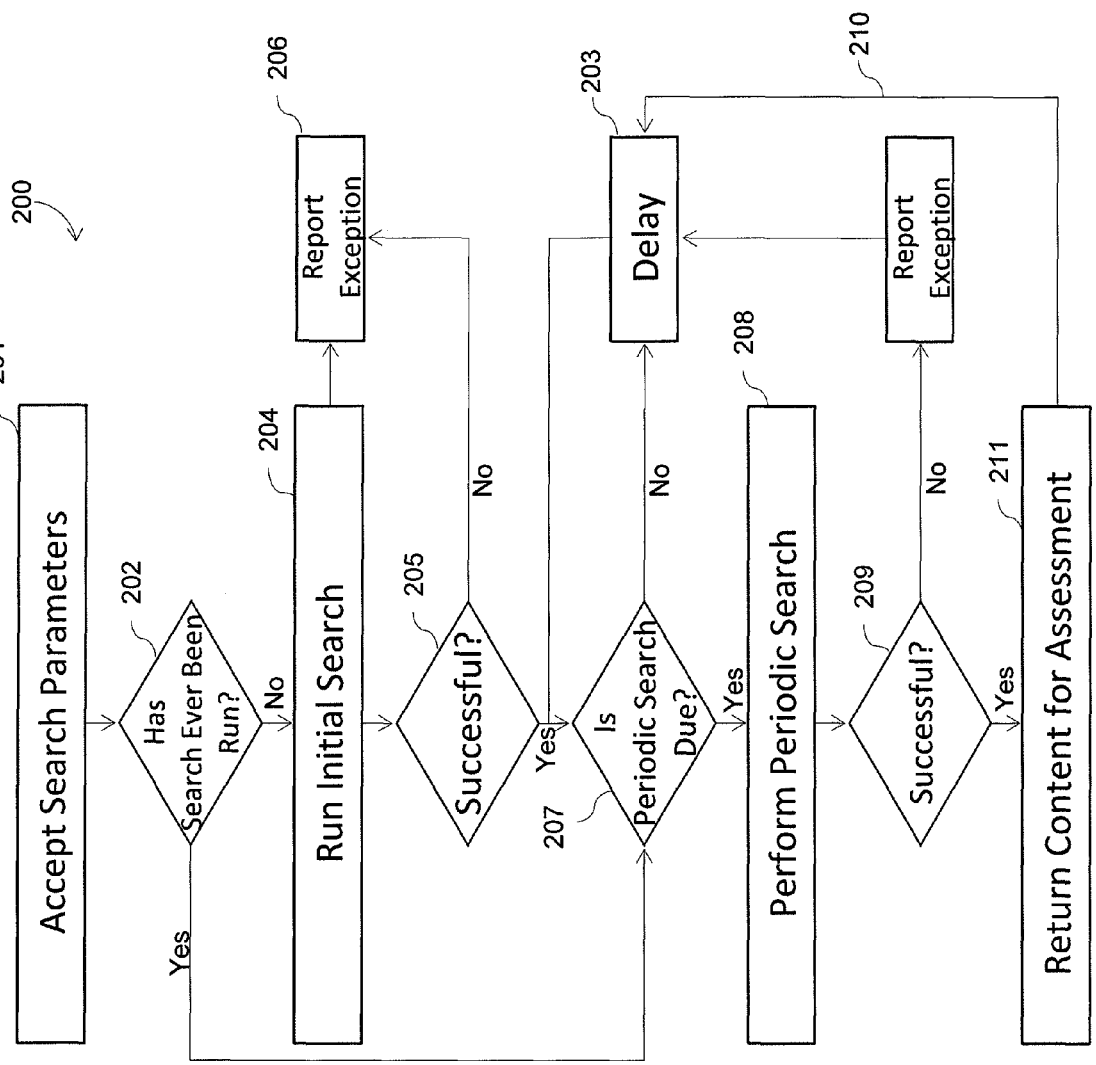
FIG. 2 is a flowchart showing the operation of the periodic searching device in an exemplary embodiment.

FIG. 2 is a generalized flow diagram illustrating a process 200 for periodically searching the repository and returning content for analysis and/or assessment by process 300.

At Step 201, search parameters and scope are accepted by the system so as to define information including but not limited to: the identification of one or more repositories, a date range for the search, content types to be returned, or not returned, and a periodic timespan for this search to be repeated. Some of these parameters may be optionally omitted, and others introduced, as the situation requires.

In an exemplary embodiment, the device accepts search parameters including the type of repository to be searched, backlog, active monitoring or advanced query process type, credentials to access a repository, any date-based range to be applied to the search, any content-based restrictions for the search, and the specified timespan between each search. An example implementation would be an IMANAGE DMS repository (as the repository type), backlog process, an appropriate admin user name and password, document edit dates between Jan. 1, 2003 and Jan. 1, 2011, content of type PDF or MSG files only, and with periodic timespan of 24 hours for the search to be performed again.

In an exemplary embodiment, the search parameter information belongs to a 'service process' that is controlled by the system 11 and is stored in the database 115. The search parameters may be passed to the device by the service process upon creation of that service process, or again upon restart of the services controlling the system, or upon reboot of the computer controlling the system.

At Step 202 the search parameters are interpreted and a determination is made as to whether the search for this service has previously run. If no, then an initial search 204 will be performed. If yes, then periodic search 208 should be performed when it is due. An initial search 204 is over the full range of dates provided in the search parameters. A periodic search 208 is from the most recent date/time searched in the last successful initial or periodic search. This periodic search method substantially avoids the possibility of needlessly returning a document more than once, regardless of the frequency of the searches which may occur, for example, at a rate of one search for Active Monitoring every 1 minute.

If initial search 204 was required and was considered successful 205 by the return of search results without exception from the repository, the individual items returned by the search are returned to the system 211 and marked for later assessment. Step 203 follows, in which a time delay is incurred and added to a counter for this service process before the check 207 is done to determine if a periodic search is due to run. In an exemplary embodiment the delay may be, e.g., 5 seconds. If the search 204 was considered unsuccessful 205 then exception handling 206 is triggered.

If initial search was not required in step 202, a step 207 determines whether the periodic search is due to run. This checks a time counter for this service process against the periodic search timespan specified in the search parameters. When the time counter is equal to or greater than the periodic search timespan, the check is successful and the periodic search process 208 will be set to run, and the counter is reset to zero. If time counter is less than the timespan then a delay step 203 follows in which a delay is incurred and added to the counter before the step 207 check is performed again. The only exit from this loop is for the periodic check condition to be met and the periodic check 208 to then run. In an exemplary embodiment a common timespan may be, e.g., 1 minute for active monitoring of new documents added to the repository. It also may be appropriate to use, e.g., a time span of 24 hours for backlog service processes so as to help ensure documents are not missed when document metadata, such as profile information, is changed on existing repository documents, making it so that the document could fall within the scope of previously run search parameters.

At step 208 the periodic search activity is performed. All or any of the repository methods for access and other methods for access may be used to perform single or multiple aggregated searches to return all content that meets the search parameters. If the periodic search was considered successful in step 209 by the return without exception of the search results from the repository, the individual items returned by the search are returned to the system 211 marked for later assessment. Step 203 follows, in which a delay is incurred and added to a counter for this service process before the check 207. If the search 208 was considered unsuccessful in step 209, then exception handling 210 is triggered.

Figure 3:
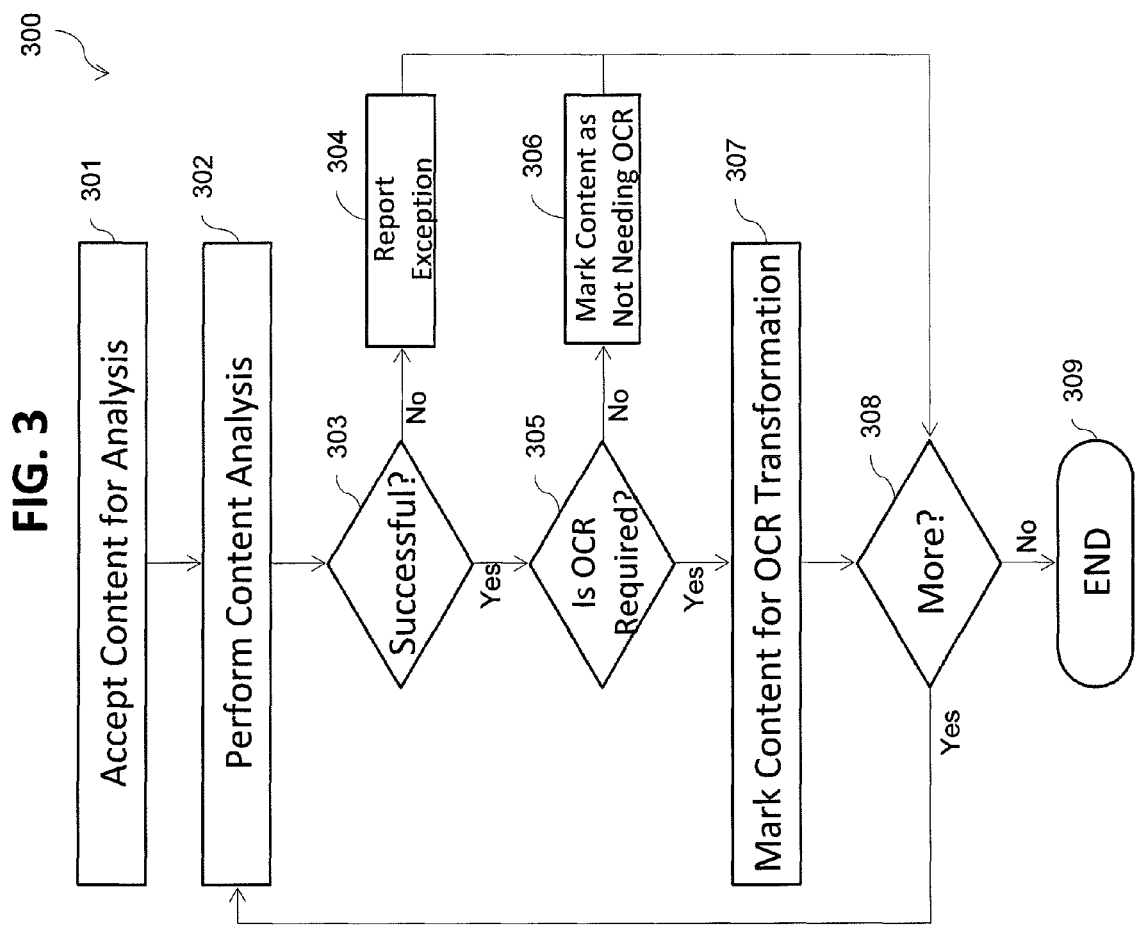
FIG. 3 is a flowchart showing operation of the content analysis heuristic engine in an exemplary embodiment.

FIG. 3 is a generalized block diagram illustrating the process 300 involving the Content Analysis Heuristic Engine in the non-trivial analysis of documents returned by process 200. In an exemplary embodiment, it assesses for which documents it is most appropriate to perform content transformation via Optical Character Recognition (OCR) at 400.

At Step 301 single or multiple documents are accepted for assessment from process 200. An example might be 10 image files, 30 PDF files and 15 MSG files. Also accepted from the service process is the instruction as to what analysis is required with respect to these search results. In an exemplary embodiment this analysis may include a determination as to whether a document has either no text or merely an insignificant amount of text.

The content analysis steps themselves are performed at Step 302. The analysis begins with a determination of the content type being assessed, since the method of analysis performed by the heuristic engine may be different depending on the file type and on the type of analysis required. In an exemplary embodiment content types may include, without limitation, TIFF, JPG, PNG etc., PDF files, Outlook MSG files, and the like. In an alternative embodiment the content types may be Word, XML, databases, PST files or any content whatever that may be stored in a repository.

The analysis required may include, without limitation, any non-trivial determination made by reference to part or all of the file content, part or all of the file structure, or part or all of the file metadata. In an exemplary embodiment, this analysis is a determination as to whether a document has no text in it or has merely an insignificant amount of text. The engine can have many heuristics to analyze content. For image file formats, non text searchability is, by definition, assured and these are automatically assessed as requiring OCR.

The heuristic to determine whether there is merely an insignificant amount of text in a PDF document involves a method of content analysis according to an exemplary embodiment. A page by page analysis is performed, and the number of characters on each page (trimmed of spaces) is counted and accumulated. A value representing the average number of such characters per page is determined by totaling all page character counts and dividing by the number of pages, resulting in an average character count. If this average character count does not exceed the target measure that is defined in the service process (i.e., does not exceed a predetermined threshold), the document is marked as requiring OCR. If the average character count does exceed the threshold, then the document is marked as being already significantly text searchable and not requiring OCR. In an alternative embodiment of the PDF heuristic, a document may be marked for OCR processing on the individual page level. In a further exemplary embodiment, the heuristic may determine a document is significantly text searchable at the first page when the running character count (as defined by sum of each page's character count) exceeds the target measure per page multiplied by the number of pages.

The MSG file heuristic, in an exemplary embodiment, involves a process to extract copies of all attachments to the MSG file, focusing on only image types, PDF, or further MSG file attachments. Image types that are inline images may be ignored. An example of such inline images is an email signature graphic or the like. Further MSG file attachments trigger a recursive processing approach allowing the achievement of any desired level of depth of MSG files inside the MSG files to be processed. The MSG file heuristic approach results in an identification of PDF files or Image files to be assessed. These assessments for those types are performed in the manner herein described.

In an alternative embodiment, the heuristics may include, without limitation, single or combined methods. Examples may include determining whether a PDF meets a particular accessibility standard or standards; determining whether a Word document is greater than 95% similar to a control document; or determining whether a significant combination of keywords or phrases, or other information, is used in a voice file stored in a repository.

In the previously described ad hoc approaches, only very simplistic methods of analysis are performed, for example, determining whether the document of type PDF. If yes, the document may be OCR'd. Even though it is wasteful to process documents that are already significantly text searchable, such ad hoc approaches can also actually have a harmful effect: the quality of text searchability may be diminished as the document is re-imaged in processing, followed by OCR processing, resulting in possibly diminished text searchability when compared with the original document.

Returning to FIG. 3, if the assessment was considered successful 303 by a return of a result from applying the heuristic analysis, without any reported exceptions, the result is returned to the system step 305 for a further determination. If the assessment was considered unsuccessful 303 then exception handling 304 is triggered.

Step 305 accepts the result from 303 and, in an exemplary embodiment, if the result is that OCR is required, it will mark the content as requiring OCR 307 for the transformation process 400 (see FIG. 4) to act on. If the result is that OCR is not required, it will mark the content as not requiring OCR 306. In both cases processing reaches step 308.

Step 308 determines whether there are more documents to be assessed. If yes, the system returns to step 302 to process the next document. If no, the process 300 ends 309.

Figure 4:
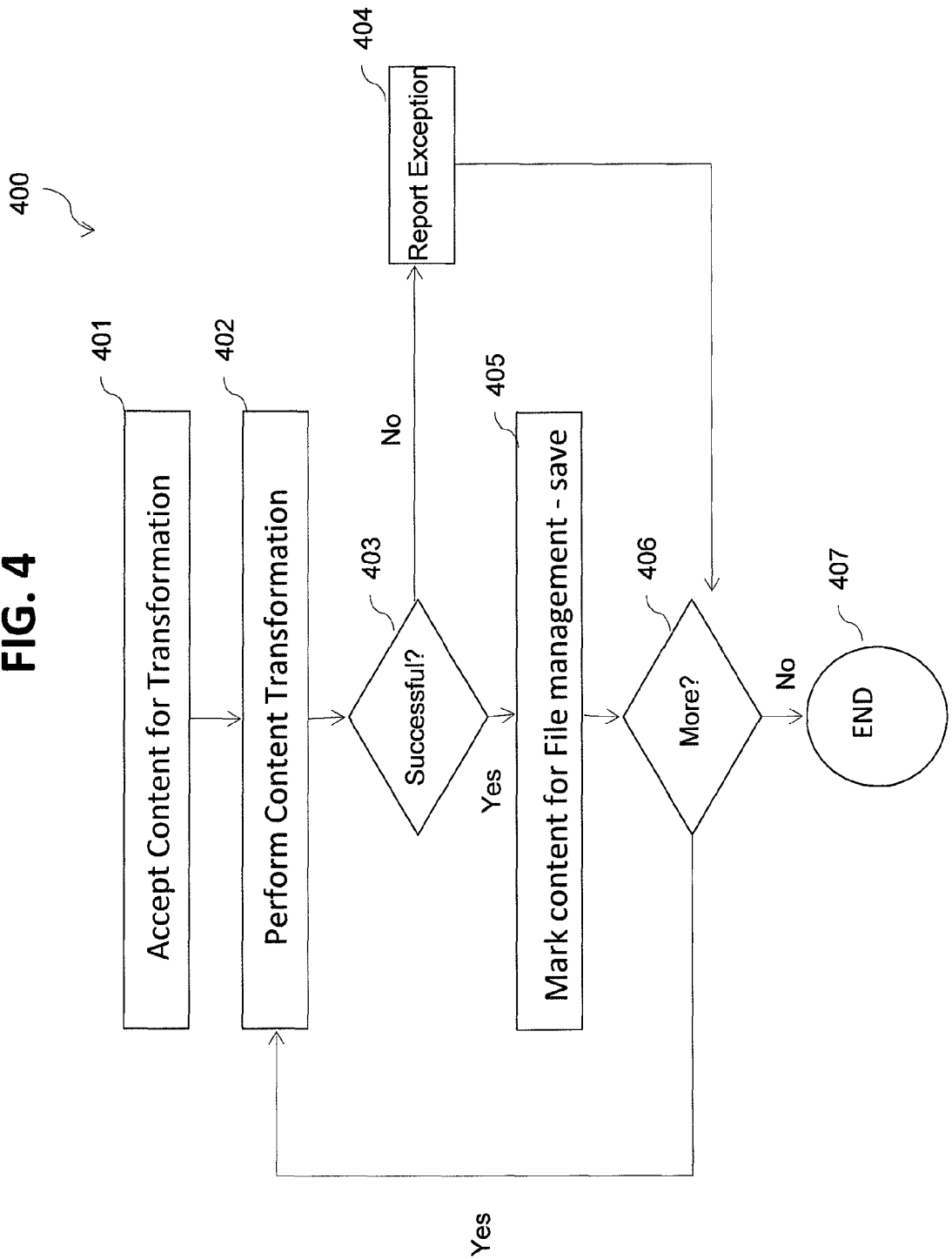
FIG. 4 is a flowchart showing operation of the processing engine in an exemplary embodiment.

FIG. 4 is a generalized block diagram illustrating the process 400 involving the transformation of documents indicated by the processing of the content analysis heuristic engine 300 as requiring transformation. In an exemplary embodiment, this transformation involves making the document text searchable using OCR and file management techniques.

At step 401, a single or multiple documents are accepted from process 300 for transformation. An example might be 10 image files, 5 PDF files and 3 MSG files with PDF or image attachments.

The transformation steps themselves are performed at 402. Transformation begins with a determination of the content type being transformed, since the method of transformation performed by the processing engine can be different depending on file type and the type of transformation required. In an exemplary embodiment, the transformation steps do differ between Image, PDF or MSG document types, but underlying these is that the OCR process is run on the content, and the text discovered from the OCR process is added to the original content to make it text searchable.

The transformation may include, but is not necessarily limited to a detailed transformation of the whole or a part of the content, or the whole or a part of the file structure, or the whole or a part of the file metadata. In an exemplary embodiment, at the core of all the transformations, is the adding of a hidden layer of text to a PDF. The hidden text is from an OCR process on the original PDF, or an OCR process on a PDF that is created from an image document. By continuing to maintain the integrity of the original document, and only transforming it by the addition of a background, hidden text layer, the exemplary embodiment avoids a major disadvantage of ad hoc approaches. That is to say, in ad hoc approaches, when the manipulation via OCR results in a new document, it may inadvertently include visual changes to the image. Furthermore, it is typically the case that there is a loss of the document annotations such as comments on PDF, attachments to PDF, form field definitions and values. Moreover, it is also typical that there is metadata lost from the file, such as custom properties. All this may affect the interpretation of this content in the future and/or reduce its value as being a valid record of the original. The transformations in the processing engine for transformation 400 maintain the integrity and fidelity of the file, visually and internally.

In an exemplary embodiment the transformations may be as described below.

An image file transformation involves the conversion of the image file into a PDF file. The PDF file references the image file properties to determine the appropriate page size and resolution to use for a conversion to the PDF format. Once PDF versions of image files are prepared, the PDF versions are then further processed as described above with respect to PDF processing.

A PDF file transformation involves stripping all of the PDF annotations from a copy of the original PDF, and then sending this stripped copy for OCR processing. This OCR processing may include applying any or all options available for the OCR processing (including, but not limited to, options such as de-speckling and de-skewing) to get the highest quality OCR result for the stripped copy document. Next, the OCR text from this stripped copy document is extracted, on a page by page basis, and inserted back into each corresponding page of a new copy of the original PDF file. In this way, the visual and internal structure of the original PDF is maintained, with the exception of the addition of the hidden text layer. This ensures that the annotations are retained, unaffected by this transformation, that the visual representation of the document is not affected by the transformation, and that the OCR text has been discovered using the advantageous available options such as those mentioned previously.

MSG file processing involves processing one or many image or PDF document attachments, as per the methods for those types and using the transformations just described. With a copy of the original MSG file, the transformed image and/or PDF documents are substituted for the original attachments. The MSG file itself stays unchanged in any other way. This advantageously supports the searching of both the MSG file and its content/attachments while keeping the nature of the document as an email, thus preserving important metadata about this content.

In an alternative exemplary embodiment, the transformation process may include, but is not limited to, the use of single or combined methods such as editing/adding content in a Word document, rearranging PDF document structure, combining/merging content, converting voice files to text, transforming video file content (voice and image) to text.

If transformation 402 was indicated as being successful in step 403, by way of a return of a valid document result from applying the transformation steps, without the generation of any exception, the result is returned to the system step 405 for a further determination. If the transformation was considered unsuccessful in step 403, by way of an indication of a processing exception, then exception handling 404 is triggered.

Step 405 accepts as an input the result that was output from step 403 and, in an exemplary embodiment, when the result indicates that a successful transformation to text searchable document has occurred, then the content is marked as requiring processing by the Save step 405, so that the save action in the file management process 500 may act on the result at a convenient and possibly later time.

Step 406 determines whether there are more documents to be transformed by the engine. If yes, then the process continues with step 402 and the next document is processed. If no, the process 400 ends with step 407.

Figure 5:
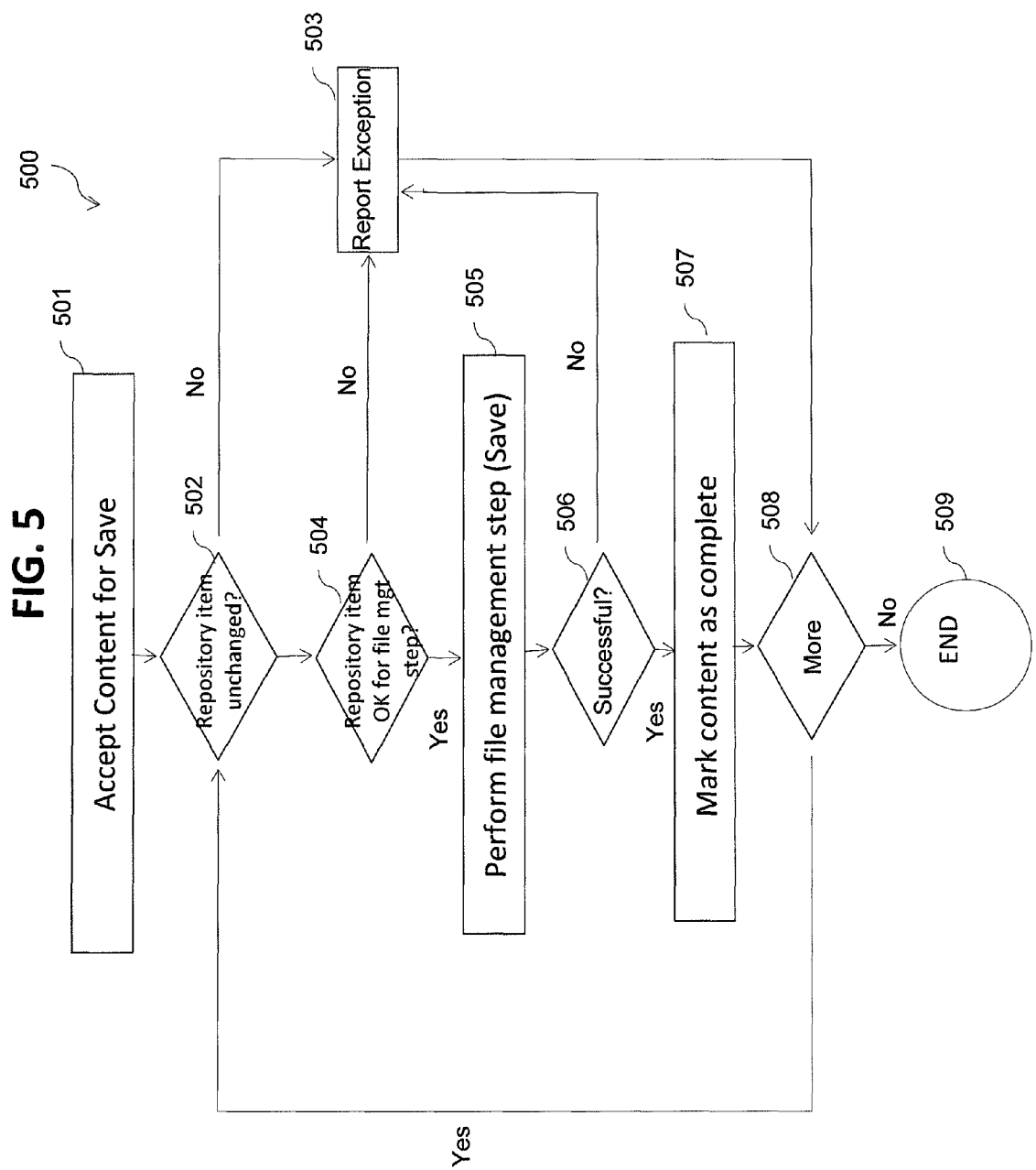
FIG. 5 is a flowchart showing operation of the file management device in an exemplary embodiment

FIG. 5 is a generalized block diagram illustrating a process 500 for use in a file management device that carries out file management processes, related to the repository, with respect to the transformed documents returned by 400. In an exemplary embodiment this file management process involves saving the transformed file back into the repository.

At step 501, one or more documents are accepted from process 400. An example would be 15 PDF files and 3 MSG files. No Image files are involved in this process because they have previously been converted to PDF. Also accepted from the service process is a repository storage instruction indicating how each transformed file is to be dealt with in the repository. In an exemplary embodiment, the repository storage instruction indicates that the transformed file is to be saved as a replacement for the existing version of document. Other storage instruction values may likewise indicate that the transformed file is to be saved as a new version of the original document, a document related to the original document, or an attachment to the original document.

Before a successful save of the transformed document, in the manner indicated by the repository storage instruction, can occur back to the repository, step 502 determines whether the original repository item has remained unchanged during the above-described processing of the overall system 11 and, more specifically, during the time since the periodic search device 111 detected this document. The reason for this step is to avoid saving a processed file on top of a more recent version. If the original repository item is unchanged, then the process continues with step 504. If the repository item has changed, for example, a new version now exists in the repository or the date last modified has changed, then the save process cannot continue and exception handling 503 is triggered.

At step 504, a further test on the original repository item is performed: the determination is made as to whether the repository is ready to receive the new, transformed content. In an exemplary embodiment, this determination is to ensure the original repository item is not checked out, or otherwise locked, and to ensure that it is not read-only, or exhibits any other indication that a new save will not be accepted. If the repository is deemed ready to receive the new content, then the process continues to step 505. If the repository cannot accept new content for any reason, then the exception handling is triggered in step 503.

The file management steps are performed at step 505. The file management may include, without limitation, the replacing of the original content in the original repository, or the creating of the new content in the same repository as the original content, or the creating of the new content in a different repository from the original content, or dealing with the transformed content in any other way, e.g., in accordance with the repository storage instruction. In an exemplary embodiment, this includes a determination of the repository type, as the particular concrete implementation method of performing the file management steps will vary. In an exemplary embodiment the repositories are AUTONOMY IMANAGE, OPEN TEXT EDOCS DM, OPEN TEXT CONTENT SERVER, WINDOWS file system and WEBDAV enabled repositories such as SHAREPOINT. In an alternative embodiment, any repository client, server, or cloud is expected.

The file management processes may include any interaction with the original content in the repository. In an exemplary embodiment this will include saving the transformed file into the repository in one of the following ways—replacement for the existing version of document, a new version, a related document, an alternative rendition, or an attachment.

In an alternative embodiment, the file management process may include but limited to updates to database tables associated with the repository or additional reports saved into the repository.

If file management steps 505 are considered successful 506 by the return of a result from the repository, without any indication of an exception, the result is that processing returns to step 507 where the processing is marked as complete. If the file management steps were considered unsuccessful 506 then exception handling 503 is triggered.

Step 508 determines whether there are more documents requiring file management steps. If yes, the system returns to step 502 to process the next document. If no, the process 500 ends at step 509.

Figure 6:
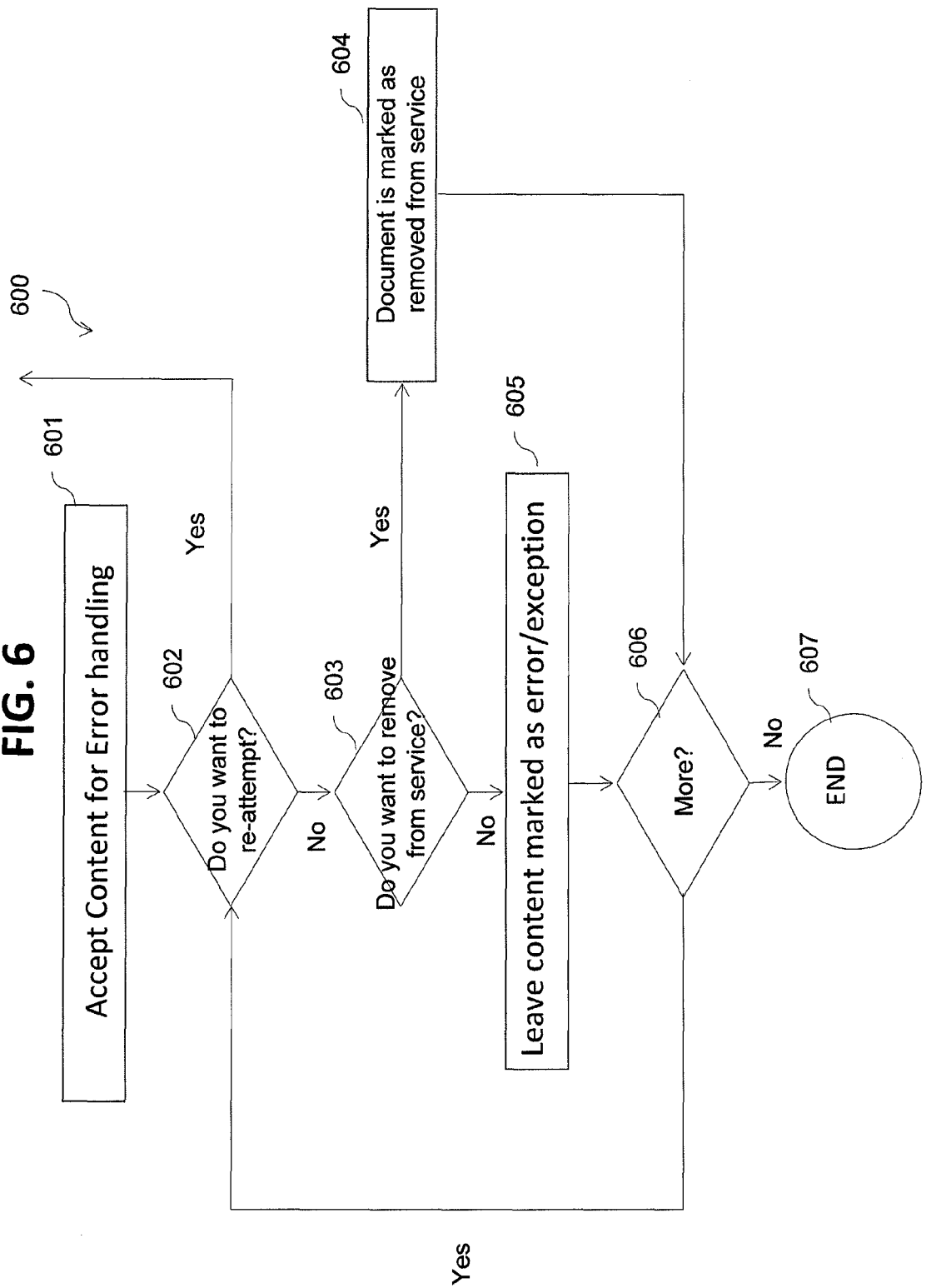
FIG. 6 is a flowchart showing exception management in an exemplary embodiment
Figure 7:
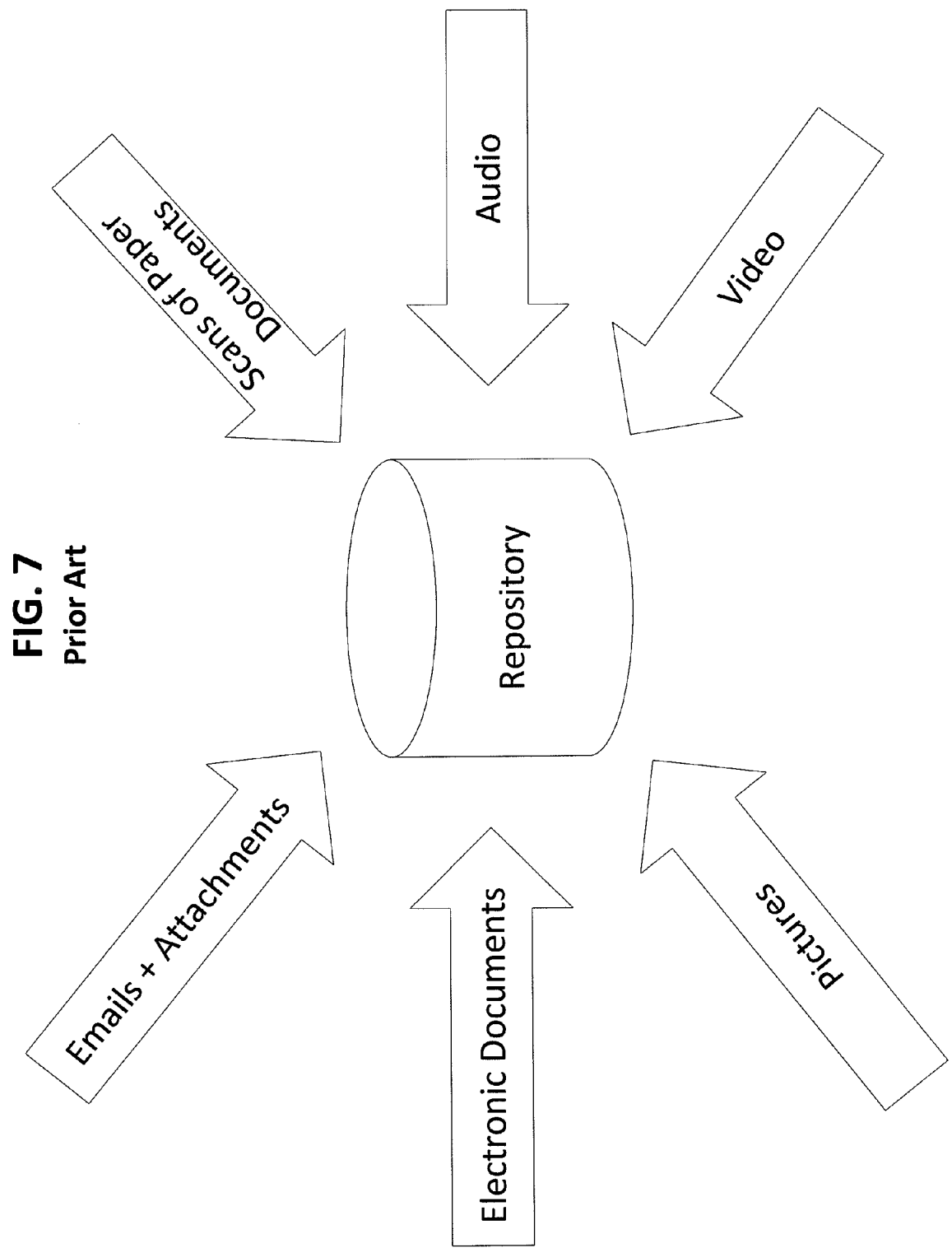
FIG. 7 illustrates the environment to which the inventive concept may be applied.

FIG. 6 is a generalized block diagram illustrating the process 600 involving the management of document exceptions received from any of the processes 200, 300, 400 and 500 in the system. In an exemplary embodiment, this exception handling process involves the management of documents indicated as having an exception status, and the subsequent actions taken in the system such as attempting to reprocess the document, or to remove this document from the system.

At step 601 single or multiple documents are accepted from specific exception handling triggers at 206, 210, 304, 404 and 503. An example would be 5 PDF documents that fail the assessment operation due to internal file corruption (i.e., corrupted PDF documents).

At step 602, a determination is made as to whether the document should have further action taken and/or be reprocessed. In an exemplary embodiment, reprocessing means the document will be returned to the start of assessment process 300. If the reprocessing determination is affirmative or yes, the processing of the document returns to 300. If no, the next operation is step 603.

A determination at Step 603 is made as to whether the exception document should be permanently removed from processing, meaning that the processing of the document will not be attempted again and would not be picked up in search results for other service processes. If yes, then the document is marked as permanently removed from processing in step 604. If no, then the document remains an exception 605.

Step 606 determines if there are more documents requiring exception management. If yes, the system returns to step 602 to process the next document. If no, the process 600 ends 607.

This inventive concept may be embodied in other forms or carried out in other ways without departing from the spirit thereof. The present embodiments are therefore to be considered in all respects illustrative and not limiting, the scope of the inventive concept being indicated by the appended claims, and all modifications falling within the meaning and range of equivalency are intended to be embraced therein.

What is claimed is:

1. A repository content analysis and management system, comprising:
    a computing system having:
        a processor;
        memory under control of the processor; and
        instructions that, when loaded into the memory, are adapted to enable the processor to carry out predetermined operations;
    wherein the predetermined operations comprise:
        searching a data repository for data content including files;
        analyzing the data content to select ones of the files for transformation, each of the selected files having a respective pre-transformation file content;
        transforming the selected files so as to produce transformed files; and
        storing the transformed files in the data repository; and
    wherein: the respective pre-transformation file content of the selected files is preserved after the production of the transformed files; and
        the transforming of a given one of the selected files is carried out by:
            determining a content type of the given selected file;
            when the content type is not a portable document format (PDF) type, generating a file having a PDF type and corresponding to the given selected file, and then carrying out a transformation with respect to the corresponding file having the PDF type;

when the content type is a PDF type, carrying out a character recognition process (OCR) with respect to the respective pre-transformation file content of the given selected file, and adding to the given selected file a hidden layer of text corresponding to an OCR result from the OCR process, to produce a corresponding transformed file, the hidden layer of text being added to the given selected file without modifying any existing content of the given selected file, thereby preserving the pre-transformation file content.

2. The system as set forth in claim 1, wherein the searching operation is automatically periodically conducted.

3. The system as set forth in claim 2, wherein the selecting of a given one of the files for transformation is carried out based on one or more of:

a respective file type of the given file;

a page by page analysis of a respective number of characters on one or more pages of the given file; and an extraction of one or more respective attachments of the given file.

4. The system as set forth in claim 3, wherein the page by page analysis is based on an averaged value of the respective number of characters for a plurality of the one or more pages of the given file.

5. The system as set forth in claim 3, wherein the extraction is carried out recursively so as to include attachments within attachments.

6. The system as set forth in claim 1, wherein:

the searching operation is carried out by a periodic searching device;

the analyzing operation is carried out by a content analysis engine;

the transforming operation is carried out by a content transformation engine; and the storing operation is carried out by a file management device.

7. A system for repository content analysis and management comprising:

a computing device having a processor, a memory under control of the processor, a storage, and software instructions stored on storage device and executed in the memory by the processor, the software instructions defining operations including:

searching repository content, previously stored in a repository, and returning an indication of one or more found documents;

analyzing the found documents to obtain an indication of ones of the found documents requiring a transformation;

applying, to the documents requiring the transformation action, transforming actions to the repository content based on the analysis to provide transformed repository content; and applying file management actions on the transformed repository content, in accordance with a repository storage instruction;

wherein the transforming actions comprise:

stripping all PDF annotations from a copy of a given document of the documents requiring transformation;

carrying out optical character recognition (OCR) processing on the stripped copy;

extracting text from the OCR processing, on a page by page basis with respect to the given document; and adding a hidden text layer, with the extracted text, to the given document on the page by page basis so that the text extracted from the stripped copy is added in the hidden layer to the corresponding page in the given document;

whereby the original given document page includes the hidden text layer as well as any previously existing PDF annotations.

8. The system as set forth in claim 7, wherein the repository includes one or more of a Document Management System (DMS), a Content Management System (CMS), an Enterprise Content Management System (ECM), a SharePoint system, a file system, and a Webdav-enabled repository.

9. The system as set forth in claim 7, wherein the searching of the repository content is carried out on a periodic basis, using repository content dates, after an initial comprehensive search operation.

10. The system as set forth in claim 9, wherein the searching of the repository content is carried out so that content is not retrieved for processing more than once.

11. The system as set forth in claim 7, wherein the searching of the repository content is carried out so that selected content includes only files that have a respective type that is one of a PDF type, an image type, and an email type.

12. The system as set forth in claim 7, wherein the analyzing of the found documents comprises:

for a page in a given document of the found documents, determining a number of text searchable characters defining a page character count; and using the character count and a predetermined threshold value to arrive at a transformation determination as to whether the given document requires transformation.

13. The system as set forth in claim 12, wherein:

the page character count is determined for each of the pages in the given document; and the transformation determination is based on an average of the respective page character count for all of the pages in the given document.

14. The system as set forth in claim 12, wherein:

the page character count is determined for each of the pages in the given document; and the transformation determination is carried out on a page by page basis so that only the pages having respective page character counts that fall below the predetermined threshold value are indicated as requiring the transformation.

15. The system as set forth in claim 12, wherein:

the predetermined threshold value represents a target average page character count;

a number of pages in the given document is determined;

the page character count is added to a respective running character count value for the given document, and the page character count is carried out on one or more successive pages of the given document until a product, of the predetermined threshold value and the number of pages in the given one of the found documents, is exceeded by the running character count value;

when the product is not exceeded by the running character count value even after accumulating the respective page character count values of all the pages in the given document, the given document is indicated as requiring the transformation; and when the product is exceed by the running character count value, the page character count for the successive pages of the given document is not determined, and the given document is indicated as not requiring the transformation.

16. The system as set forth in claim 7, wherein the carrying out of the OCR processing on the stripped copy includes, prior to the OCR processing, one or more of a de-speckling operation and a de-skewing operation and other OCR preparation stages.

17. The system as set forth in claim 7, further comprising stripping metadata from the stripped copy while preserving the metadata in the given document to which the hidden text layer is added.

18. The system as set forth in claim 7, wherein the analyzing of the found documents includes a recursive analysis of attachments of email message attachments to obtain the indication of ones of the found documents requiring the transformation.

19. The system as set forth in claim 7, wherein the file management actions comprise one or more of:
    replacing the original repository content in the repository;
    creating new content in the same repository as the original;
    creating the new content in the same repository, with a relation between the new content and the original;
    creating the new content in a different repository from the original; and
    creating the new content in the different repository from original, with the relation between the new content and the original.

20. The system as set forth in claim 7, wherein the file management actions comprise one or more of:
    saving the transformed repository content over the original;
    saving the transformed repository content as a new version of the original;
    saving the transformed repository content as an attachment to the original;
    saving the transformed repository content as a rendition of the original; and
    saving the transformed repository content as a new content in the repository.

* * * * *